Patented Feb. 2, 1932

1,843,434

UNITED STATES PATENT OFFICE

RUDOLF WIETZEL, DECEASED, LATE OF LUDWIGSHAFEN-ON-THE-RHINE, BY ELSE WIETZEL, ADMINISTRATRIX, OF WILHELMSHORST, AND MAX HERBST, OF MANNHEIM, GERMANY, ASSIGNORS TO I. G. FARBENINDUSTRIE AKTIENGESELL-SCHAFT, OF FRANKFORT-ON-THE-MAIN, GERMANY

CONCENTRATION OF AQUEOUS FORMIC ACID

No Drawing. Application filed December 16, 1930, Serial No. 502,855, and in Germany December 18, 1929.

The present invention relates to the production of concentrated formic acid from aqueous solutions thereof.

In the known methods of concentrating aqueous formic acid the water present is either removed by agents for withdrawing water, as for example salts or sulphuric acid, or the separation is effected by solvents or absorbents, or the formic acid is first separated in the form of its esters or salts and is then converted into the free acid again in a suitable manner. On the other hand concentrated formic acid has been prepared by decomposing mixtures of ammonium formate and formamide with the aid of sulphuric acid in the presence of water.

We have now found that formic acid is concentrated in a particularly advantageous manner by incorporating dilute aqueous formic acid with formamide and then saponifying the latter by adding a highly concentrated or gaseous mineral acid, the resulting highly concentrated formic acid being then separated from the ammonium salt of the mineral acid formed by distillation, filtration or similar known and convenient method. The quantity of formamide should generally correspond to that of the water present, the water being consumed by the cleavage of the formamide. For the same reason the water content of the mineral acid must be so low that it is consumed by the formation of formic acid. In both cases the quantity of formamide employed will correspond to the desired strength of the final formic acid. Nitric acid may be employed, but usually the employment of a non-oxidizing mineral acid is more advantageous.

In this manner, contrasted with known methods, the water is caused to take part in a reaction by which it is used up and by which, moreover, still more formic acid is formed in addition to a readily removable and valuable by-product.

Although it is known to prepare formic acid from formamide, concentrated mineral acids, especially sulphuric acid, and water according to the equation:

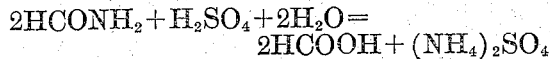

the use of dilute formic acid for this reaction, highly concentrated formic acid being thus prepared, is novel and valuable industrially. The process according to the present invention may be carried out, for example, as follows: An amount of formamide corresponding to the water content of the formic acid (according to the above equation) is dissolved in the diulte formic acid and the equivalent amount of concentrated sulphuric acid is added a little at a time while stirring. In some cases, when the water content of the formic acid is rather high, the heat evolved during the mixing is sufficient to produce the temperature most favorable for a rapid conversion, viz. from about 60° to 80° C. or sometimes even cooling to the said temperature is necessary, otherwise the said temperature is attained by heating after the sulphuric acid has been added. In contrast to expectation the evolution of carbon monoxide only takes place when sulphuric acid has been added in excess to the quantity required for the decomposition of formamide and the temperature has risen too high. After two hours at the most the reaction is completed. The ammonium sulphate which separates on cooling is filtered off and the formic acid may, if desired, be redistilled at atmospheric or reduced pressure. The formic acid may also be separated by distillation without separating the ammonium sulphate formed. In the distillation at a pressure below atmospheric pressure it is preferable to intercept non-condensed formic acid vapor by water or formamide between the receiver and the suction apparatus during the distillation, the resulting solution containing formic acid being added during the concentration of a fresh amount of formic acid, and in this manner any loss of formic acid is prevented.

The following examples will further illustrate the nature of this invention, but the invention is not restricted to these examples. The parts are by weight.

*Example 1*

220 parts of formamide are added to 500 parts of an 85 per cent aqueous formic acid.

250 parts of sulphuric acid having a specific gravity of 1.838 are allowed to flow in during the course of half an hour, the temperature is kept at 60° C. for another 2 hours, the whole is allowed to cool and the liquid is filtered off from the precipitated ammonium sulphate. The filtrate is distilled in vacuo. 610 parts of a 98 per cent formic acid and 340 grams of ammonium sulphate are obtained.

*Example 2*

300 parts of a 96.7 per cent aqueous formic acid are mixed with 30 parts of formamide. 34.5 parts of sulphuric acid having a specific gravity of 1.838 are allowed to flow in during the course of half an hour while stirring and the whole is heated to 60° C. for 2 hours. The formic acid is distilled off in vacuo from the ammonium sulphate formed while interposing an intensive washing vessel containing formamide between the receiver and the vacuum pump. Formic acid of 100 per cent strength is obtained in a yield of 95 per cent.

*Example 3*

85 per cent aqueous formic acid is mixed with 37.5 per cent its weight of formamide. 30 per cent by weight of the formic acid of gaseous hydrogen chloride are led into the mixture. Heating takes place which is sufficient to carry the reaction to completion. The ammonium chloride formed is separated from the formic acid by distillation in vacuo. Formic acid of 96.5 per cent strength is obtained in a yield of 92 per cent.

*Example 4*

500 parts of a 50 per cent formic acid are mixed with 748 parts of formamide; 860 parts of a 95 per cent sulphuric acid are allowed to flow in while stirring, the temperature being maintained between 60° and 80° C. The ammonium sulphate is separated by filtration by suction whilst the formic acid is distilled in vacuo. 960 parts of formic acid of 98 per cent strength and 1050 parts of ammonium sulphate are obtained.

*Example 5*

468 parts of sulphuric acid of 1.84 specific gravity are allowed to flow slowly into a mixture of 200 parts of aqueous formic acid of 32 per cent strength with 407 parts of formamide, the whole being then maintained between 60° and 80° C. for about 2 hours. The ammonium sulphate formed is separated by filtration and the formic acid is purified by distillation in vacuo. 98 per cent of formic acid of 97.5 per cent strength are obtained.

What we claim is:

1. The process for the production of concentrated formic acid from its aqueous solutions which comprises adding formamide to the said solutions and decomposing it with a highly concentrated mineral acid, the concentrated formic acid being then separated from the resulting ammonium salt of the mineral acid employed.

2. The process for the production of concentrated formic acid from its aqueous solutions which comprises adding formamide to the said solutions and decomposing it with an anhydrous mineral acid, the concentrated formic acid being then separated from the resulting ammonium salt of the mineral acid employed.

3. The process for the production of concentrated formic acid from its aqueous solutions which comprises adding formamide to the said solutions and decomposing it with a gaseous mineral acid, the concentrated formic acid being then separated from the resulting ammonium salt of the mineral acid employed.

4. The process for the production of concentrated formic acid from its aqueous solutions which comprises adding formamide to the said solutions and decomposing it with concentrated sulphuric acid, the concentrated formic acid being then separated from the resulting ammonium sulphate.

5. The process for the production of concentrated formic acid from its aqueous solutions which comprises adding formamide to the said solutions and decomposing it with gaseous hydrochloric acid, the concentrated formic acid being then separated from the resulting ammonium chloride.

In testimony whereof we affix our signatures.

ELSE WIETZEL,
*Administratrix of Rudolf Wietzel, Deceased.*
MAX HERBST.